(12) United States Patent
Doi et al.

(10) Patent No.: US 9,520,948 B2
(45) Date of Patent: Dec. 13, 2016

(54) OPTICAL TRANSMISSION DEVICE

(71) Applicant: Fujitsu Optical Components Limited, Kawasaki-shi, Kanagawa (JP)

(72) Inventors: Masaharu Doi, Sapporo (JP); Yoshinobu Kubota, Yokohama (JP); Yoshitada Kawashima, Sapporo (JP); Teruhiro Kubo, Kitahiroshima (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/615,603

(22) Filed: Feb. 6, 2015

(65) Prior Publication Data
US 2015/0261017 A1 Sep. 17, 2015

(30) Foreign Application Priority Data

Mar. 11, 2014 (JP) ................................. 2014-047913

(51) Int. Cl.
| | | |
|---|---|---|
| H04B 10/50 | (2013.01) | |
| G02B 6/34 | (2006.01) | |
| G02F 1/1335 | (2006.01) | |

(52) U.S. Cl.
CPC ............... *H04B 10/501* (2013.01); *G02B 6/34* (2013.01); *H04B 10/506* (2013.01); *G02F 2001/133607* (2013.01)

(58) Field of Classification Search
CPC ................... H04B 10/50–10/506; G02B 6/34; G02F 2001/133607
USPC .................................................. 398/182–201
See application file for complete search history.

(56) References Cited

U.S. PATENT DOCUMENTS

| | | | | |
|---|---|---|---|---|
| 3,388,314 A | * | 6/1968 | Gould ................... | H01S 3/0007 219/121.6 |
| 3,552,859 A | * | 1/1971 | Snyder, III ............. | G01C 25/00 250/225 |
| 5,223,975 A | * | 6/1993 | Naganuma ........... | G02B 6/2713 359/484.02 |
| 5,682,236 A | * | 10/1997 | Trolinger ............. | G01B 11/164 356/28.5 |
| 6,297,907 B1 | * | 10/2001 | Wang ................... | G02B 27/288 349/106 |
| 6,819,872 B2 | * | 11/2004 | Farries ................. | G02B 6/2861 398/102 |

(Continued)

FOREIGN PATENT DOCUMENTS

| | | |
|---|---|---|
| JP | 2001-36505 | 2/2001 |
| WO | WO 03/009436 | 1/2003 |

*Primary Examiner* — Li Liu
(74) *Attorney, Agent, or Firm* — Staas & Halsey LLP

(57) ABSTRACT

A substrate is a substrate on which a first optical modulator and a second optical modulator are arranged in parallel along a width direction. A first prism moves, to a side opposite to the second optical modulator along the width direction of the substrate, an optical path of the first output light and the second output light that are obtained by light of the first wavelength being modulated by the first optical modulator. A second prism is arranged at a position away from the first prism along a longitudinal direction of the substrate and moves, to a side opposite to the first modulator along the width direction of the substrate, an optical path of the third output light and the fourth output light that are obtained by the light of the second wavelength being modulated by the second optical modulator.

13 Claims, 6 Drawing Sheets

(56) References Cited

U.S. PATENT DOCUMENTS

| | | |
|---|---|---|
| 7,340,122 B2 | 3/2008 | Welch et al. |
| 8,270,067 B1 * | 9/2012 | Hsieh .................. H04B 10/677 |
| | | 356/477 |
| 2003/0194237 A1 * | 10/2003 | Farries ................ G02B 6/2861 |
| | | 398/102 |

* cited by examiner

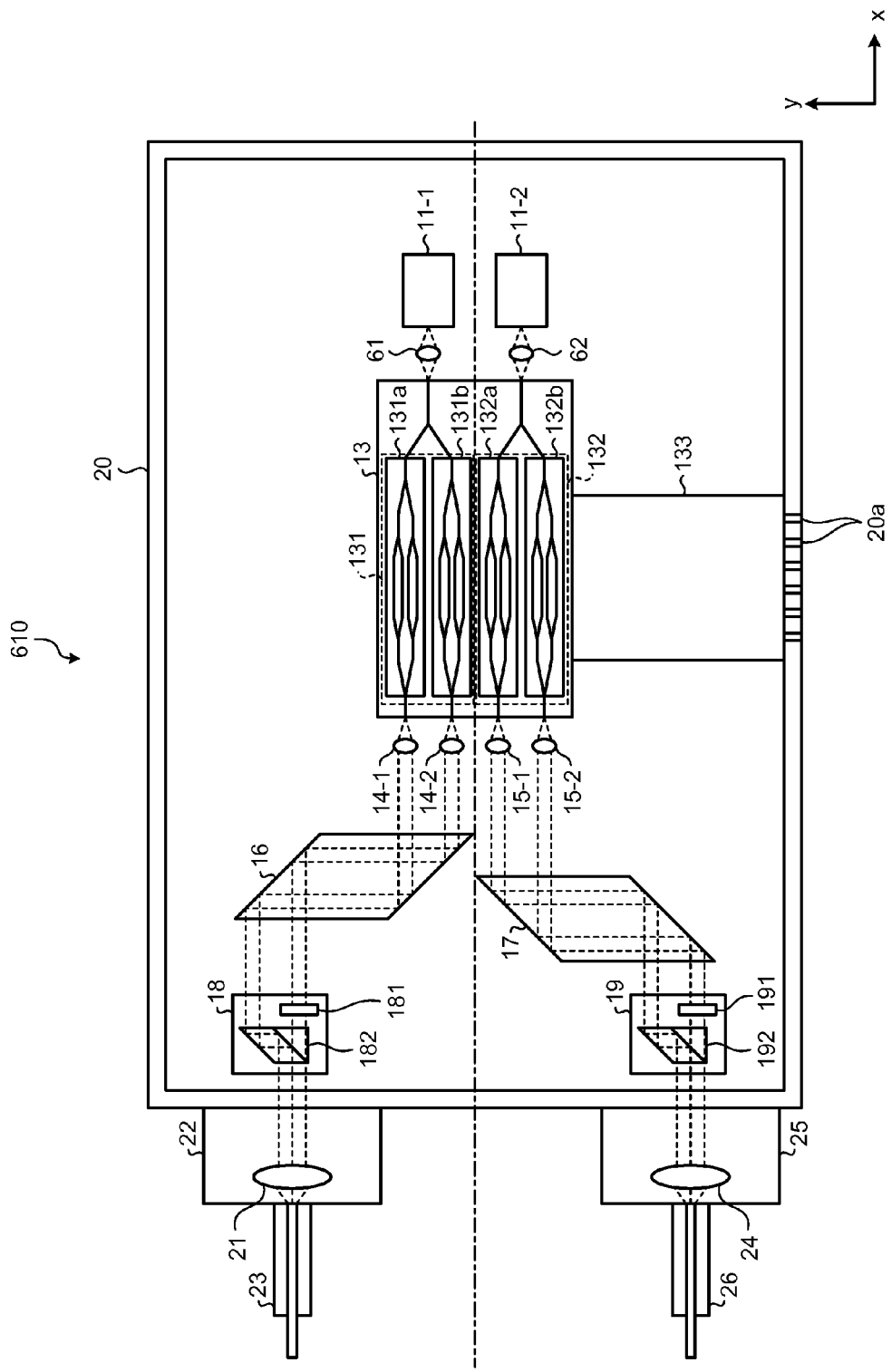

OPTICAL TRANSMISSION DEVICE

CROSS-REFERENCE TO RELATED APPLICATION

This application is based upon and claims the benefit of priority of the prior Japanese Patent Application No. 2014-047913, filed on Mar. 11, 2014, the entire contents of which are incorporated herein by reference.

FIELD

The embodiments discussed herein are directed to an optical transmission device.

BACKGROUND

A polarization multiplexing system is known as a transmission system to speed up an optical communication system. The Polarization multiplexing system is a transmission system in which two pieces of independent data are transmitted at a time by using polarization multiplexed light that is obtained by combining signal light having polarized waves orthogonally intersecting each other.

In an optical transmission device that uses the polarization multiplexing system, an optical modulator that modulates light of a predetermined wavelength is installed. The two pieces of the signal light obtained from light of the predetermined wavelength by being modulated by the optical modulator are combined in a state in which the polarized waves are orthogonally intersected with each other and are output, as polarization multiplexed light, to optical transmission path on the downstream side.

Regarding the optical transmission devices, studies have been conducted on various kinds of technologies that further improve the communication speed. For example, there is a known technology in which a plurality of optical modulators associated with a plurality of different wavelengths is integrally arranged on a single substrate. With this technology, two optical modulators that modulate two pieces of light of different wavelengths are arranged in parallel in the width direction.

Patent Document 1: Japanese Laid-open Patent Publication No. 2001-036505

However, the conventional technology described above is not considered the prevention of damage to optical components while reducing the size of the device in which a plurality of optical modulators is integrally arranged on a single substrate.

This point will be described below. It is conceivable that, in order to integrally arrange a plurality of optical modulators on a single substrate, the width of the substrate is increased. However, if the width of the substrate is increased, a reduction in the size of the overall device is prevented. Furthermore, if the width of the substrate is increased, because the transmission distance of an electrical signal that is used by an optical modulator to modulate light becomes long, the electrical signal is attenuated. As a result, the quality of the signal light that is obtained from the light modulated by using the electrical signal is degraded. To avoid the degradation of the quality of such signal light, the width of the substrate is preferably reduced.

To solve this problem, it is conceivable to use a structure in which optical components called an optical path changing prism are arranged downstream of each of the modulators and the distance of an optical path of the signal light that is output from each of the modulators is increased in the width direction. With this structure, even if the width of the substrate is decreased, it is possible to secure space that is used to arrange another optical component on the downstream side of the optical path changing prism. However, there is a problem in that, as the width of a substrate is decreased, a possibility of damage due to optical path changing prisms being brought into contact becomes high.

SUMMARY

According to an aspect of an embodiment, an optical transmission device includes a substrate on which a first optical modulator that modulates light of a first wavelength and a second optical modulator that modulates light of a second wavelength are arranged in parallel in a width direction; a first prism that moves, to a side opposite to the second optical modulator along the width direction of the substrate, an optical path of first output light and second output light that are obtained by the light of the first wavelength being modulated by the first optical modulator; and a second prism that is arranged at a position away from the first prism along a longitudinal direction of the substrate and that moves, to a side opposite to the first modulator along the width direction of the substrate, an optical path of third output light and fourth output light that are obtained by the light of the second wavelength being modulated by the second optical modulator.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a schematic diagram illustrating a configuration example of an optical transmission device according to a sixth embodiment.

DESCRIPTION OF EMBODIMENTS

Preferred embodiments of the present invention will be explained with reference to accompanying drawings. The technology disclosed in the present invention is not limited to these embodiments.

First Embodiment

Figure 1:
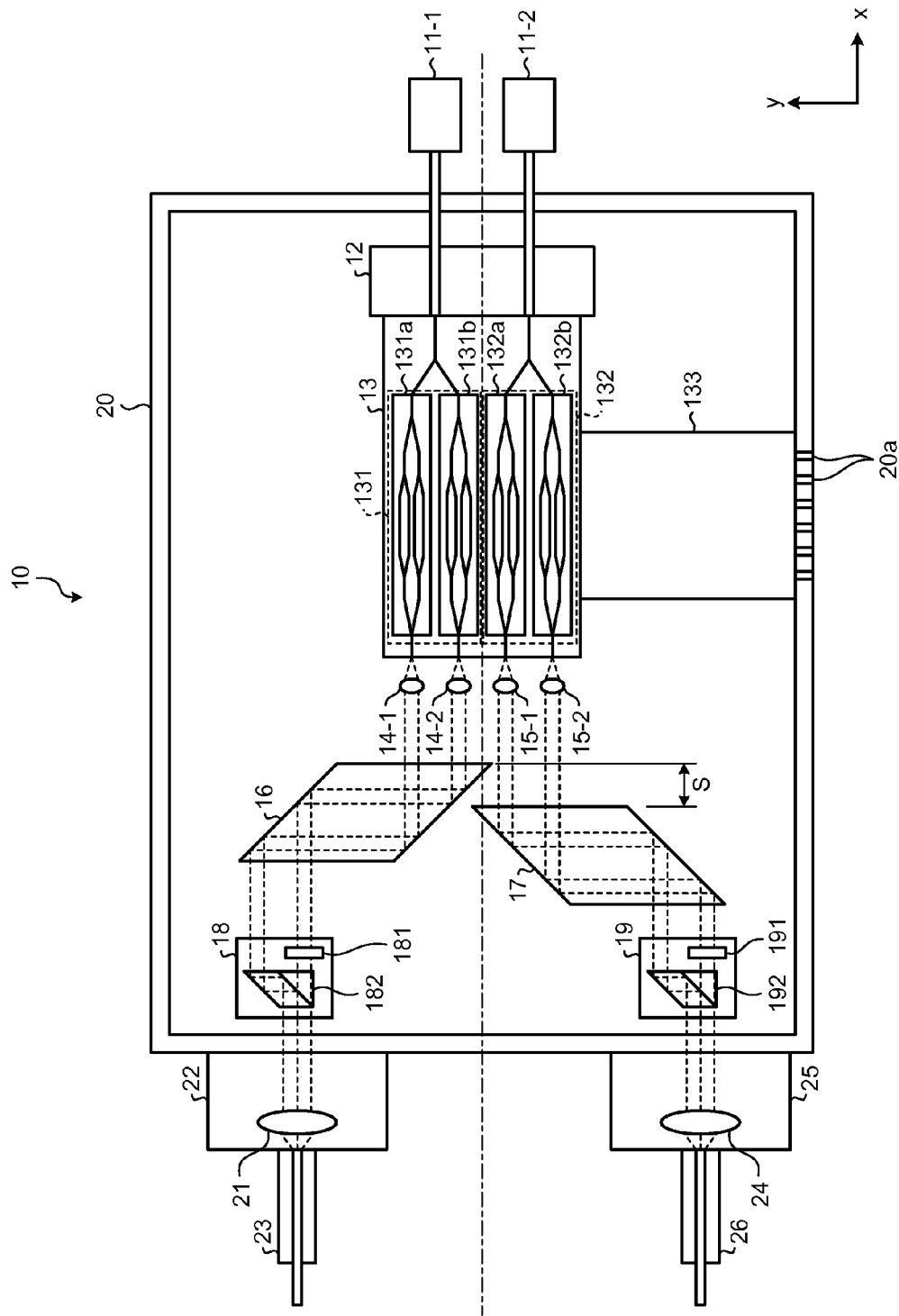
FIG. 1 is a schematic diagram illustrating a configuration example of an optical transmission device according to a first embodiment.

FIG. 1 is a schematic diagram illustrating a configuration example of an optical transmission device according to a first embodiment. An optical transmission device 10 illustrated in FIG. 1 includes light sources 11-1 and 11-2, a connecting block 12, a modulator substrate 13, collimator lenses 14-1 and 14-2, collimator lenses 15-1 and 15-2, an optical path changing prism 16, and an optical path changing prism 17. Furthermore, the optical transmission device 10 includes a polarized beam combiner 18, a polarization beam combiner 19, a casing 20, a focusing lens 21, a lens holder 22, an optical fiber 23, a focusing lens 24, a lens holder 25, and an optical fiber 26.

Furthermore, in FIG. 1, it is assumed that the y axis is defined in the width direction of the modulator substrate 13 and assumed that the x axis is defined in the longitudinal direction of the modulator substrate 13. Furthermore, it is assumed that the opposite side of a second optical modulator 132 in the width direction of the modulator substrate 13 is the positive direction of the y axis and assumed that the opposite side of a first optical modulator 131 in the width direction of the modulator substrate 13 is the negative direction of the y axis. Furthermore, it is assumed that the opposite side of the optical path changing prism 16 in the longitudinal direction of the modulator substrate 13 is the positive direction of the x axis and assumed that the side of the optical path changing prism 16 in the longitudinal direction of the modulator substrate 13 is the negative direction of the x axis.

The light sources 11-1 and 11-2 emit light of different wavelengths. Specifically, the light source 11-1 emits the light of the wavelength $\lambda 1$, whereas the light source 11-2 emits the light of the wavelength $\lambda 2$ that is different from the wavelength $\lambda 1$. The light of the wavelength $\lambda 1$ and the light of the wavelength $\lambda 2$ are examples of the light of a first wavelength and the light of a second wavelength, respectively.

The connecting block 12 is a block that optically connects the light sources 11-1 and 11-2 and the modulator substrate 13. The light of the wavelength $\lambda 1$ emitted from the light source 11-1 is input to the first optical modulator 131 via the connecting block 12 on the modulator substrate 13, which will be described later. The light of wavelength $\lambda 2$ emitted from the light source 11-2 is input to the second optical modulator 132 via the connecting block 12 on the modulator substrate 13, which will be described later.

The modulator substrate 13 is a substrate that is connected to a relay substrate 133 and that is used to modulate the light by using an electrical signal supplied from the relay substrate 133. On the modulator substrate 13, the first optical modulator 131 and the second optical modulator 132 are arranged in parallel in the width direction of the modulator substrate 13, i.e., in the y-axis direction.

The first optical modulator 131 modulates the light of the wavelength $\lambda 1$ that is input from the light source 11-1 via the connecting block 12. Specifically, the first optical modulator 131 includes an optical modulating unit 131a and an optical modulating unit 131b. When the light of the wavelength $\lambda 1$ is split off by an optical coupler or the like, the optical modulating unit 131a modulates the light of the wavelength $\lambda 1$, which is obtained one of the light due to the split, by using an electrical signal supplied from the relay substrate 133. In a description below, the light that is obtained from the light of the wavelength $\lambda 1$ modulated by the optical modulating unit 131a is referred to as first output light. The optical modulating unit 131a outputs the first output light to the collimator lens 14-1.

The optical modulating unit 131b modulates the other one of the light of the wavelength $\lambda 1$, which is obtained by the split, by using an electrical signal supplied from the relay substrate 133. In a description below, the light that is obtained from the light of the wavelength $\lambda 1$ modulated by the optical modulating unit 131b is referred to as second output light. The optical modulating unit 131b outputs the second output light to the collimator lens 14-2.

The second optical modulator 132 modulates the light of the wavelength $\lambda 2$ that is input from the light source 11-2 via the connecting block 12. Specifically, the second optical modulator 132 includes an optical modulating unit 132a and an optical modulating unit 132b. When the light of the wavelength $\lambda 2$ is split off by an optical coupler of the like, the optical modulating unit 132a modulates the light of the wavelength $\lambda 2$, which is obtained one of the light due to the split, by using an electrical signal supplied from the relay substrate 133. In a description below, the light that is obtained from the light of the wavelength $\lambda 2$ modulated by the optical modulating unit 132a is referred to as third output light. The optical modulating unit 132a outputs the third output light to the collimator lens 15-1.

The optical modulating unit 132b modulates the other one of the light of the wavelength $\lambda 2$, which is obtained by the split, by using an electrical signal supplied from the relay substrate 133. In a description below, the light that is obtained from the light of the wavelength $\lambda 2$ modulated by the optical modulating unit 132b is referred to as fourth output light. The optical modulating unit 132b outputs the fourth output light to the collimator lens 15-2.

The collimator lenses 14-1 and 14-2 are arranged between the modulator substrate 13 and the optical path changing prism 16 and collimate the first output light and the second output light that are input from the optical modulating unit 131a and the optical modulating unit 131b, respectively.

The collimator lenses 15-1 and 15-2 are arranged between the modulator substrate 13 and the optical path changing prism 17 and collimate the third output light and the fourth output light that are input from the optical modulating unit 132a and the optical modulating unit 132b, respectively.

The optical path changing prism 16 moves the optical paths of the first output light and the second output light collimated by the collimator lenses 14-1 and 14-2, respectively, in the positive direction of the y axis. In other words, the optical path changing prism 16 moves the optical paths of the first output light and the second output light in the direction in which the distance between the optical paths of the first and the second output light and the optical paths of the third and the fourth output light is increased.

The optical path changing prism 17 moves the optical paths of the third output light and the fourth output light collimated by the collimator lenses 15-1 and 15-2, respectively, in the negative direction of the y axis. In other words, the optical path changing prism 17 moves the optical paths of the third output light and the fourth output light in the direction in which the distance between the optical paths of the first and the second output light and the optical paths of the third and the fourth output light is increased.

Furthermore, the optical path changing prism 17 is arranged in the longitudinal direction of the modulator substrate 13, i.e., arranged in the x-axis direction and at the position away from the optical path changing prism 16. In the example illustrated in FIG. 1, the optical path changing prism 17 is arranged in the negative direction of the x axis and at the position away from the optical path changing prism 16 by the distance S that is previously set such that the optical path changing prism 16 is not brought into contact with the optical path changing prism 17.

Furthermore, the optical path changing prism 17 is arranged in the x-axis direction and at the position away from the optical path changing prism 16 so as to be overlapped with a part of the optical path changing prism 16 when viewed from the x-axis direction. Because the optical path changing prism 17 is overlapped with a part of the optical path changing prism 16 when viewed from the x-axis direction, it is possible to minimize the distance between the end of the optical path changing prism 16 that is present on the positive direction side of the y axis and the end of the optical path changing prism 17 that is present on the negative direction side of the y axis.

The polarization beam combiner 18 performs polarization combination on the first output light and the second output light that are output from the optical path changing prism 16. Specifically, the polarization beam combiner 18 includes a half-wave plate 181 and a polarization beam combiner (PBC) prism 182. The half-wave plate 181 rotates the polarized wave of one of the first output light and the second output light that are output from the optical path changing prism 16 by 90 degrees with respect to the polarized wave of the other one of the output light. In the example illustrated in FIG. 1, the half-wave plate 181 rotates the polarized wave of the second output light that is output from the optical path changing prism 16 by 90 degrees with respect to the polarized wave of the first output light.

The PBC prism 182 performs polarization combination on one of the output light whose polarized wave is rotated by the half-wave plate 181 and the other one of the output light, thereby the PBC prism 182 generates polarization multiplexed light.

The polarization beam combiner 19 performs polarization combination on the third output light and the fourth output light that are output from the optical path changing prism 17. Specifically, the polarization beam combiner 19 includes a half-wave plate 191 and a PBC prism 192. The half-wave plate 191 rotates the polarized wave of one of the third output light and the fourth output light that are output from the optical path changing prism 17 by 90 degrees with respect to the polarized wave of the other one of the output light. In the example illustrated in FIG. 1, the half-wave plate 191 rotates the polarized wave of the fourth output light that is output from the optical path changing prism 17 by 90 degrees with respect to the polarized wave of the third output light.

The PBC prism 192 performs polarization combination on one of the output light whose polarized wave is rotated by the half-wave plate 191 and the other one of the output light, thereby the PBC prism 192 generates polarization multiplexed light.

The casing 20 accommodates the connecting block 12, the modulator substrate 13, the collimator lenses 14-1 and 14-2, the collimator lenses 15-1 and 15-2, the optical path changing prism 16, the optical path changing prism 17, the polarization beam combiner 18, and the polarization beam combiner 19. On the side wall of the casing 20, connectors 20a that is arranged outside the casing 20 and that electrically connects the relay substrate 133 and an electrical signal source (not illustrated) that generates an electrical signal that is used to modulate light are arranged.

The focusing lens 21 collects, toward the optical fiber 23, the polarization multiplexed light that is obtained from the first output light and the second output light by being subjected to the polarization combination by the polarization beam combiner 18.

The lens holder 22 is secured outside the casing 20 and holds the focusing lens 21. The lens holder 22 is secured outside the casing 20 by, for example, laser welding.

The optical fiber 23 transmits the polarization multiplexed light collected by the focusing lens 21 to the downstream side.

The focusing lens 24 collects, toward the optical fiber 26, the polarization multiplexed light that is obtained from the third output light and the fourth output light by being subjected to the polarization combination by the polarization beam combiner 19.

The lens holder 25 is secured outside the casing 20 and holds the focusing lens 24. The lens holder 25 is secured outside the casing 20 by, for example, laser welding.

The optical fiber 26 transmits the polarization multiplexed light collected by the focusing lens 24 to the downstream side.

In the following, an operation of the optical transmission device 10 according to the first embodiment will be described. The light of the wavelength $\lambda 1$ emitted from the light source 11-1 in the optical transmission device 10 is input to the first optical modulator 131 on the modulator substrate 13 via the connecting block 12. The light of the wavelength $\lambda 2$ emitted from the light source 11-2 is input to the second optical modulator 132 on the modulator substrate 13 via the connecting block 12. Then, the light of the wavelength $\lambda 1$ that is input to the first optical modulator 131 is modulated by the optical modulating unit 131a and the optical modulating unit 131b, thereby the first output light and the second output light are obtained. In contrast, the light of the wavelength $\lambda 2$ that is input to the second optical modulator 132 is modulated by the optical modulating unit 132a and the optical modulating unit 132b, thereby the third output light and the fourth output light are obtained.

Then, the first output light and the second output light that are output from the first optical modulator 131 are collimated by the collimator lenses 14-1 and 14-2, respectively. In contrast, the third output light and the fourth output light that are output from the second optical modulator 132 are collimated by the collimator lenses 15-1 and 15-2, respectively.

Then, the optical path of the first output light and the second output light collimated by the collimator lenses 14-1 and 14-2, respectively, is moved in the positive direction of the y axis by the optical path changing prism 16. In contrast, the optical path of the third output light and the fourth output light collimated by the collimator lenses 15-1 and 15-2, respectively, is moved in the negative direction of the y axis by the optical path changing prism 17. Namely, the distance between the optical path of the first output light and the second output light collimated by the collimator lenses 14-1 and 14-2, respectively, and the optical path of the third output light and the fourth output light collimated by the collimator lenses 15-1 and 15-2 is increased. Consequently, even if the width of the modulator substrate 13 is reduced, it is possible to secure space for arranging optical components, such as the polarization beam combiner 18 and the polarization beam combiner 19, on the downstream side of the optical path changing prism 16 and the optical path changing prism 17.

However, there is a high possibility that the optical path changing prism 16 and the optical path changing prism 17 are brought into contact and are damaged as the width of the modulator substrate 13 becomes excessively decreased. On this point, with the optical transmission device 10 according to the first embodiment, the optical path changing prism 17 is arranged in the longitudinal direction of the modulator substrate 13, i.e., arranged in the x-axis direction and at the position away from the optical path changing prism 16. Consequently, even if the width of the modulator substrate 13 is reduced, the contact between the optical path changing prism 16 and the optical path changing prism 17 can be avoided.

Thereafter, the first output light and the second output light whose optical path is moved by the optical path changing prism 16 are subjected to polarization combination by the polarization beam combiner 18. In contrast, the third output light and the fourth output light whose optical path is moved by the optical path changing prism 17 are subjected to polarization combination by the polarized wave combiner 19.

Then, the polarization multiplexed light that is obtained from the first output light and the second output light subjected to the polarization combination by the polarization beam combiner 18 is collected toward the optical fiber 23 by the focusing lens 21. In contrast, the polarization multiplexed light that is obtained from the third output light and the fourth output light subjected to the polarization combination by the polarization beam combiner 19 is collected toward the optical fiber 26 by the focusing lens 24.

As described above, the optical transmission device 10 according to the first embodiment includes the modulator substrate 13 on which the first optical modulator 131 that modulates the light of the wavelength λ1 and the second optical modulator 132 that modulates the light of the wavelength λ2 are arranged in parallel in the width direction. Furthermore, the optical transmission device 10 includes the optical path changing prism 16 that moves, to the side opposite to the second optical modulator 132 in the width direction of the modulator substrate 13, the optical path of the first output light and the second output light that are obtained from the light of the wavelength λ1 modulated by the first optical modulator 131. Furthermore, the optical transmission device 10 includes the optical path changing prism 17 that moves, to the side opposite to the first optical modulator 131 in the width direction of the modulator substrate 13, the optical path of the third output light and the fourth output light that are obtained from the light of the wavelength λ2 by the second optical modulator 132. Then, the optical path changing prism 17 is arranged in the longitudinal direction of the modulator substrate 13 and at the position away from the optical path changing prism 16.

Consequently, according to the first embodiment, even if the width of the modulator substrate 13 is reduced, the contact between the optical path changing prism 16 and the optical path changing prism 17 can be avoided. As a result, according to the first embodiment, the damage of the optical path changing prism 16 and the optical path changing prism 17 can be prevented while reducing the size of the optical transmission device 10 in which the first optical modulator 131 and the second optical modulator 132 are integrally arranged on the single modulator substrate 13. Furthermore, according to the first embodiment, because the width of the modulator substrate 13 can be reduced as much as possible, it is possible to shorten the transmission distance of an electrical signal that is used by the first optical modulator 131 and the second optical modulator 132 on the modulator substrate 13 to modulate light. Consequently, according to the first embodiment, the degradation of the quality of the light emitted from the first optical modulator 131 and the second optical modulator 132 can be reduced.

Furthermore, with the optical transmission device 10 according to the first embodiment, the optical path changing prism 17 is arranged in the longitudinal direction of the modulator substrate 13 and at the position away from the optical path changing prism 16 such that the optical path changing prism 17 is overlapped with a part of the optical path changing prism 16 when viewed from the longitudinal direction of the modulator substrate 13.

Consequently, according to the first embodiment, the distance between the end of the optical path changing prism 16 that is present on the positive direction side of the y axis and the end of the optical path changing prism 17 that is present on the negative direction side of the y axis is minimized. As a result, according to the first embodiment, the size of the optical transmission device 10 in which the first optical modulator 131 and the second optical modulator 132 are integrally arranged on the single modulator substrate 13 can be reduced in the width direction of the modulator substrate 13.

Furthermore, with the optical transmission device 10 according to the first embodiment, the lens holder 22 and the lens holder 25 are secured outside the modulator substrate 13 by laser welding.

Consequently, according to the first embodiment, if the loss difference between the polarized waves of the polarization multiplexed light is present, the loss difference between the polarized waves can be reduced by adjusting the position of the lens holder 22 or the lens holder 25 and the position of the optical fiber 23 or the optical fiber 26. Furthermore, when positions are shifted at the time of laser welding, fine adjustment is possible by additional welding. As a result, according to the first embodiment, it is possible to reduce, for each wavelength, the loss difference between the polarized waves of the polarization multiplexed light.

Furthermore, with the optical transmission device 10 according to the first embodiment, the polarization beam combiner 18 includes the half-wave plate 181 and the PBC prism 182. Furthermore, the polarization beam combiner 19 includes the half-wave plate 191 and the PBC prism 192.

Consequently, according to the first embodiment, it is possible to reduce the size of the polarization beam combiner 18 and the polarization beam combiner 19, and, as a result, it is possible to further reduce the size of the optical transmission device 10.

Second Embodiment

Figure 2:
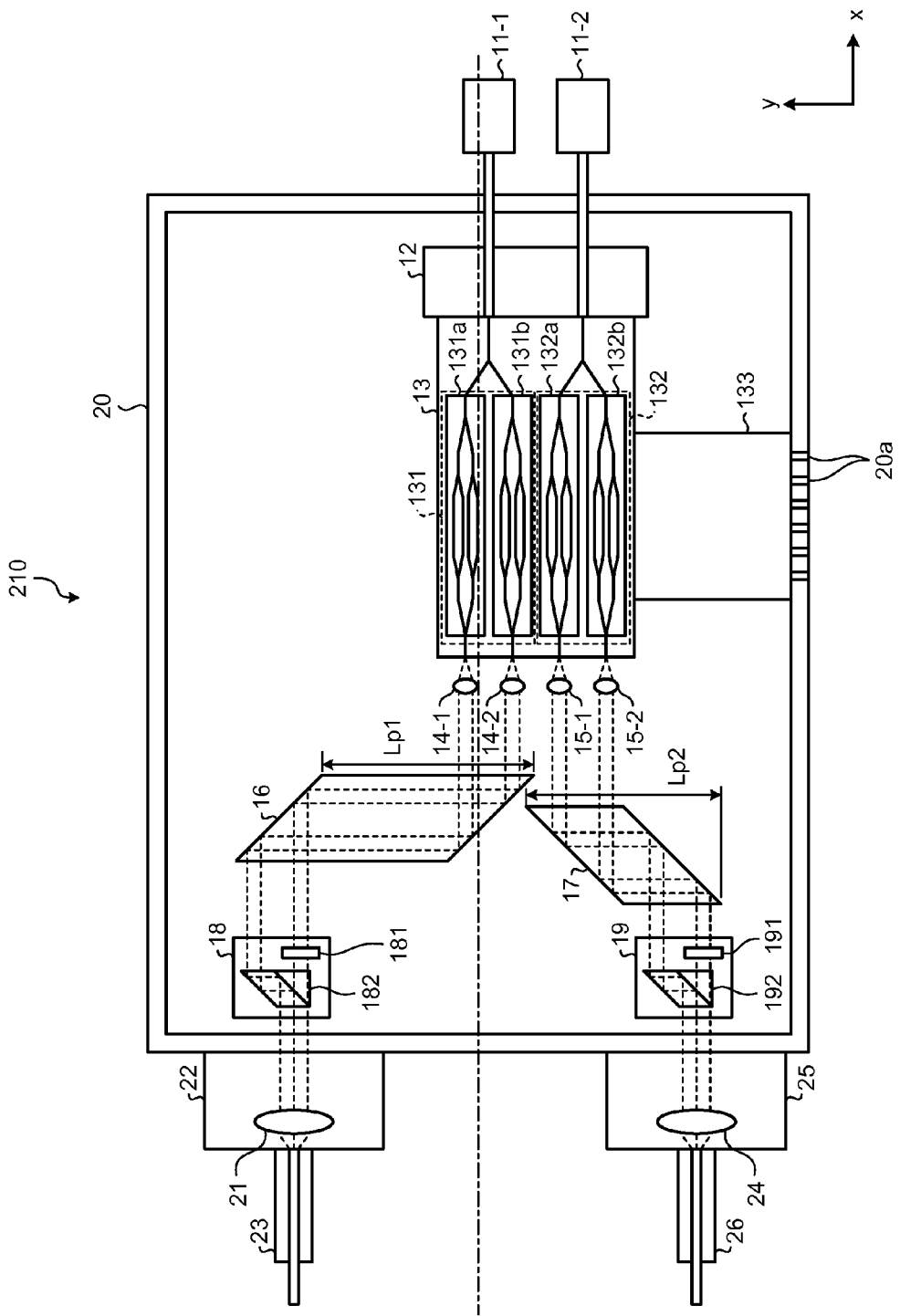
FIG. 2 is a schematic diagram illustrating a configuration example of an optical transmission device according to a second embodiment.

In the following, an optical transmission device 210 according to a second embodiment will be described with reference to FIG. 2. FIG. 2 is a schematic diagram illustrating a configuration example of an optical transmission device according to a second embodiment. The optical transmission device 210 according to the second embodiment differs from the first embodiment in that the shape or the like of the optical path changing prism differs and the configuration of the other components is the same as that in the first embodiment. Accordingly, in a description below, components having the same configuration as those in the first embodiment are assigned the same reference numerals; therefore, descriptions thereof will be omitted.

As illustrated in FIG. 2, with the optical transmission device 210 according to the second embodiment, the length of the optical path changing prism 16 in the width direction of the modulator substrate 13 is different from that of the optical path changing prism 17. For example, in the example illustrated in FIG. 2, a length Lp2 of the optical path changing prism 17 in the y-axis direction is smaller than a length Lp1 of the optical path changing prism 16 in the y-axis direction. Accordingly, the distance between the modulator substrate 13 and the connector 20a of the casing 20 becomes small.

As described above, with the optical transmission device 210 according to the second embodiment, the length of the optical path changing prism 16 in the width direction of the modulator substrate 13 is different from that of the optical path changing prism 17. Accordingly, according to the second embodiment, the distance between the modulator substrate 13 and the connector 20a of the casing 20 can be freely adjusted, and thus the degree of freedom of the arrangement of the other optical components is increased. As a result, according to the second embodiment, it is possible to further reduce the size of the optical transmission device 210 in which the first optical modulator 131 and the second optical modulator 132 are integrally arranged on the single modulator substrate 13.

Third Embodiment

Figure 3:
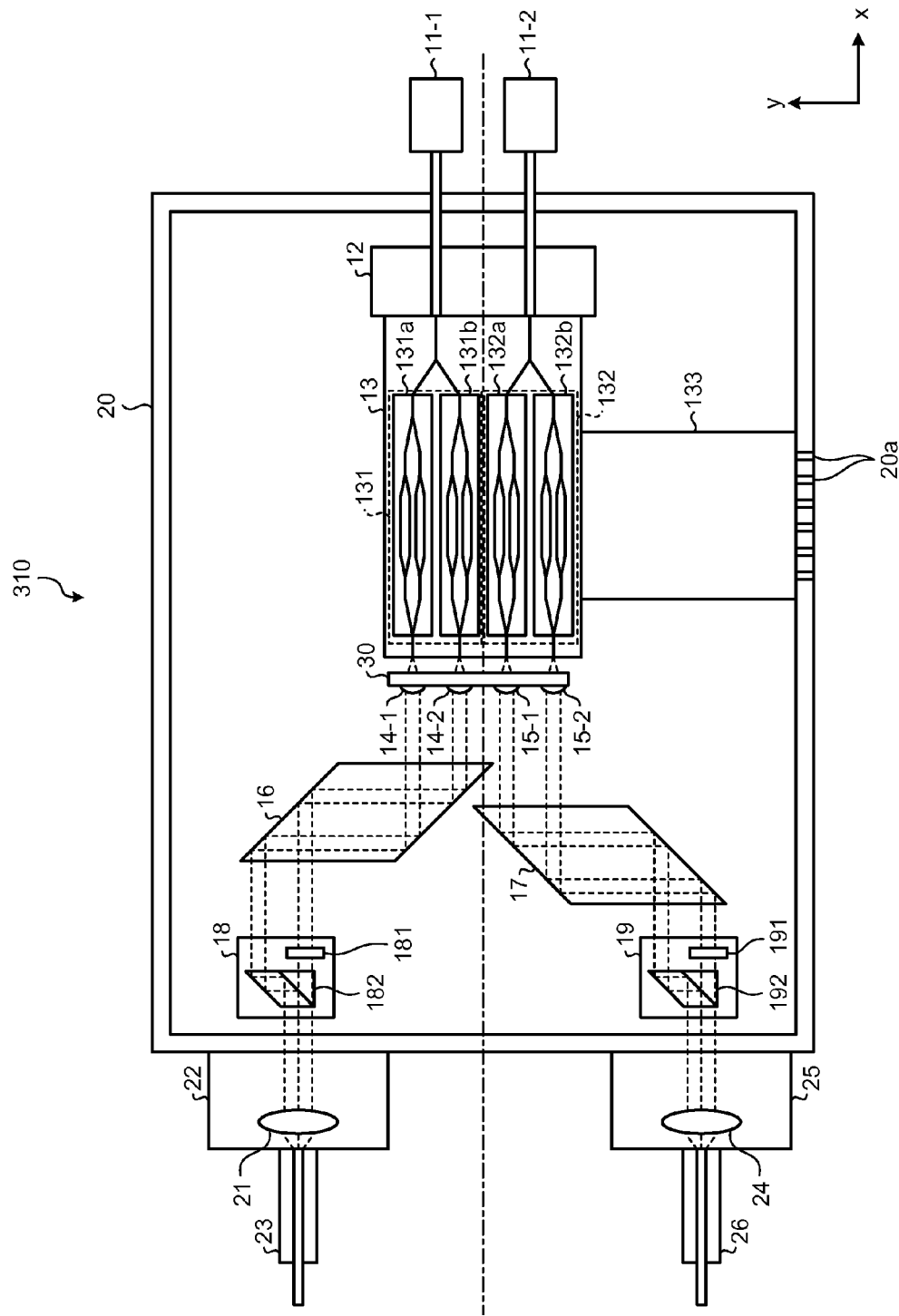
FIG. 3 is a schematic diagram illustrating a configuration example of an optical transmission device according to a third embodiment.

In the following, an optical transmission device 310 according to a third embodiment will be described with reference to FIG. 3. FIG. 3 is a schematic diagram illustrating a configuration example of an optical transmission device according to a third embodiment. The optical transmission device 310 according to the third embodiment differs from the first embodiment in that a plurality of collimator lenses is held in an array and the configuration of the other components is the same as that in the first embodiment. Accordingly, in a description below, components having the same configuration as those in the first embodiment are assigned the same reference numerals; therefore, descriptions thereof will be omitted.

As illustrated in FIG. 3, the optical transmission device 310 according to the third embodiment further includes a collimator lens holding member 30. The collimator lens holding member 30 holds the collimator lenses 14-1 and 14-2 and the collimator lenses 15-1 and 15-2 in an array in the y-axis direction.

As described above, the optical transmission device 310 according to the third embodiment includes the collimator lens holding member 30 that holds the collimator lenses 14-1 and 14-2 and the collimator lenses 15-1 and 15-2 in an array in the y-axis direction. Consequently, according to the third embodiment, the working efficiency can be improved when a collimator lens is mounted.

Fourth Embodiment

Figure 4:
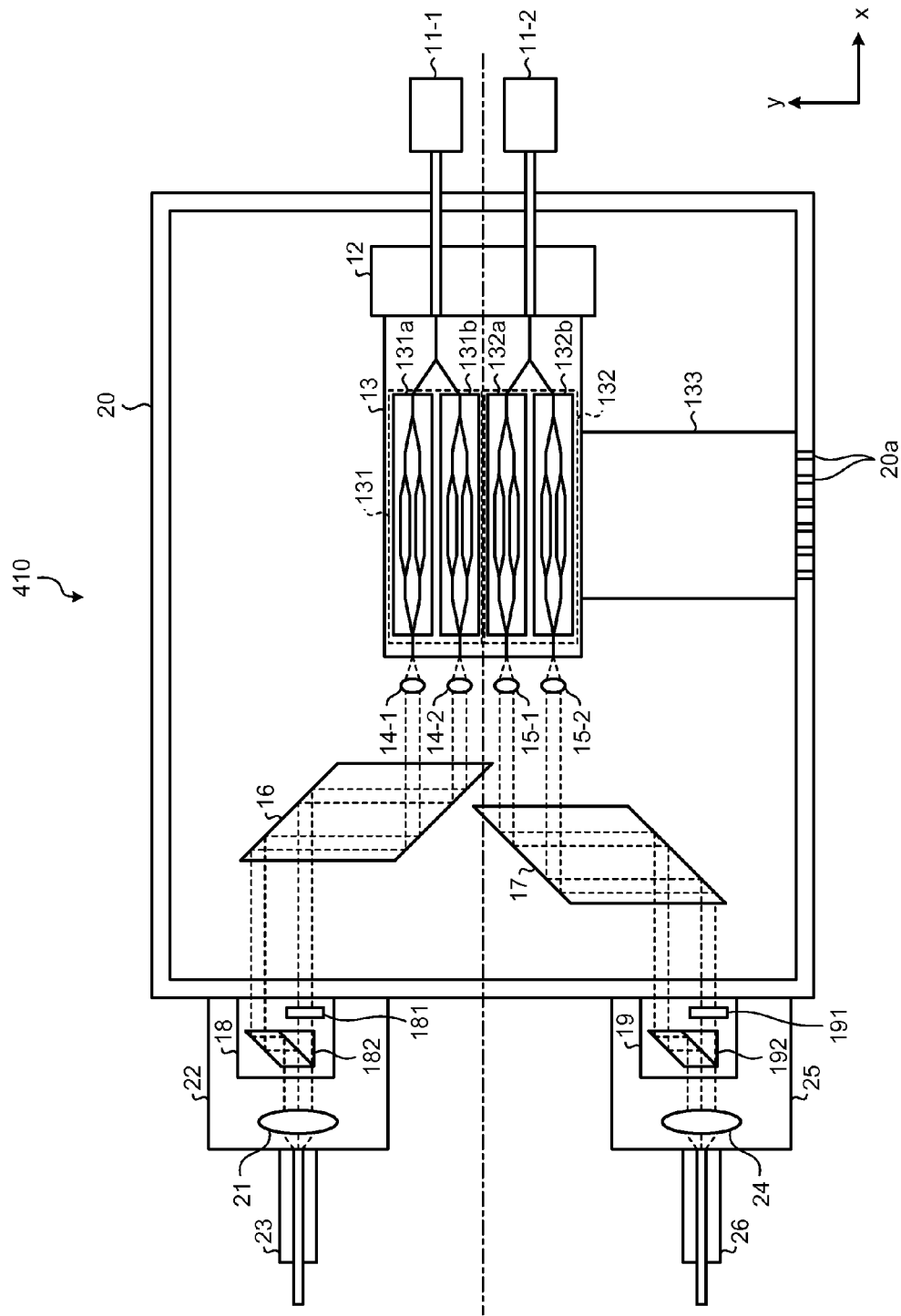
FIG. 4 is a schematic diagram illustrating a configuration example of an optical transmission device according to a fourth embodiment.

In the following, an optical transmission device 410 according to a fourth embodiment will be described with reference to FIG. 4. FIG. 4 is a schematic diagram illustrating a configuration example of an optical transmission device according to a fourth embodiment. The optical transmission device 410 according to the fourth embodiment differs from the first embodiment in that the polarization beam combiner and the focusing lens are integrally held and the configuration of the other components is the same as that in the first embodiment. Accordingly, in a description below, components having the same configuration as those in the first embodiment are assigned the same reference numerals; therefore, descriptions thereof will be omitted.

As illustrated in FIG. 4, with the optical transmission device 410 according to the fourth embodiment, the casing 20 does not include the polarization beam combiner 18. Furthermore, the lens holder 22 integrally holds the polarization beam combiner 18 and the focusing lens 21. Furthermore, the lens holder 25 integrally holds the polarization beam combiner 19 and the focusing lens 24.

As described above, with the optical transmission device 410 according to the fourth embodiment, the lens holder 22 integrally holds the polarization beam combiner 18 and the focusing lens 21. Furthermore, the lens holder 25 integrally holds the polarization beam combiner 19 and the focusing lens 24. Consequently, according to the fourth embodiment, the size of the casing 20 can be reduced by an area corresponding to the polarization beam combiner 18 and the polarization beam combiner 19 in the width direction of the modulator substrate 13. As a result, the size of the optical transmission device 10 in which the first optical modulator 131 and the second optical modulator 132 are integrally mounted on the single modulator substrate 13 can be reduced in the width direction of the modulator substrate 13.

Fifth Embodiment

Figure 5:
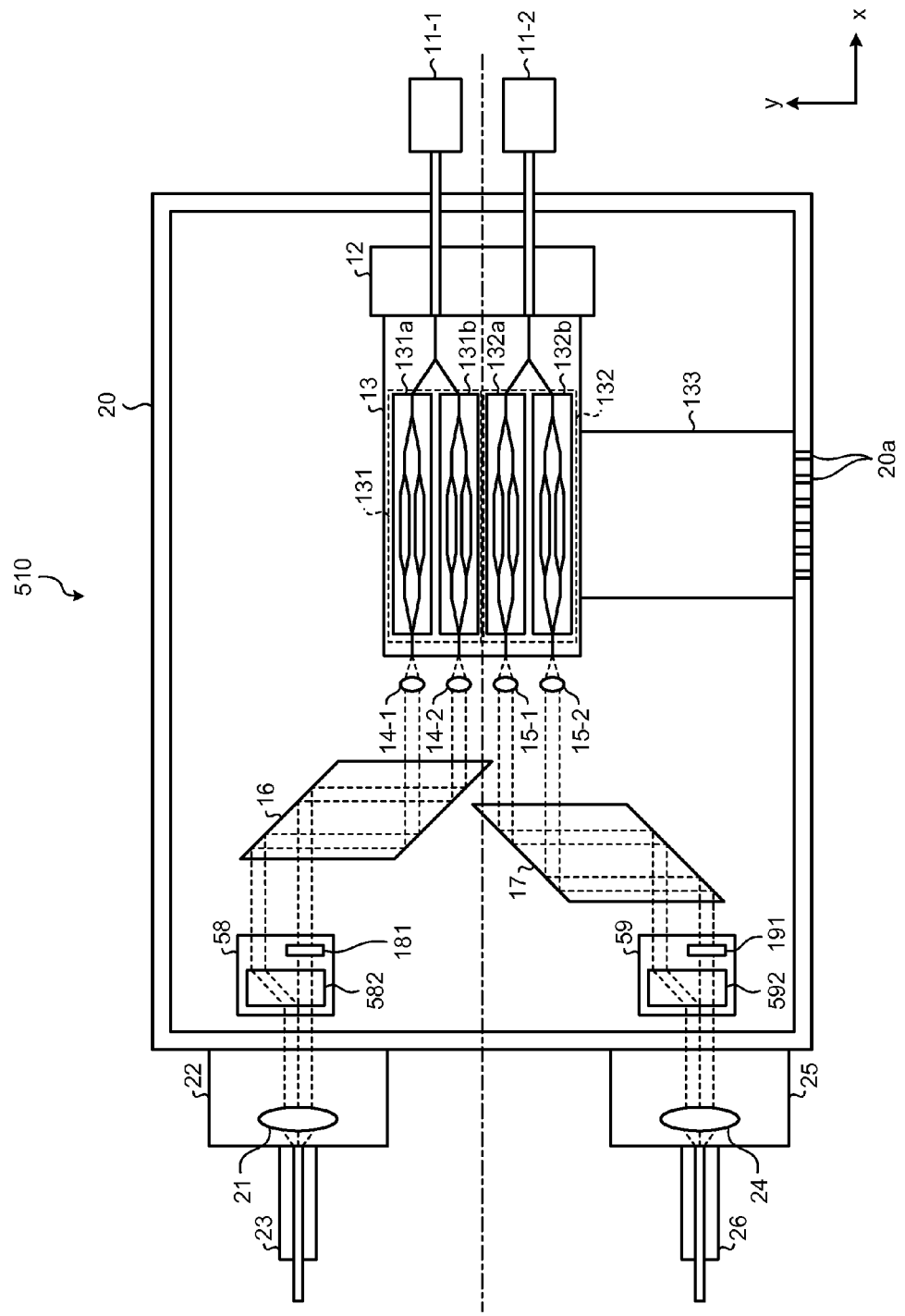
FIG. 5 is a schematic diagram illustrating a configuration example of an optical transmission device according to a fifth embodiment.

In the following, an optical transmission device 510 according to a fifth embodiment will be described with reference to FIG. 5. FIG. 5 is a schematic diagram illustrating a configuration example of an optical transmission device according to a fifth embodiment. The optical transmission device 510 according to the fifth embodiment differs from the first embodiment in that the configuration of the polarization beam combiner and the configuration of the other components is the same as that in the first embodiment. Accordingly, in a description below, components having the same configuration as those in the first embodiment are assigned the same reference numerals; therefore, descriptions thereof will be omitted.

As illustrated in FIG. 5, the optical transmission device 510 according to the fifth embodiment includes a polarization beam combiner 58 and a polarization beam combiner 59 instead of the polarization beam combiner 18 and the polarization beam combiner 19, respectively, illustrated in FIG. 1.

The polarization beam combiner 58 performs polarization combination on the first output light and the second output light that are output from the optical path changing prism 16. Specifically, the polarized wave combiner 58 includes the half-wave plate 181 and a uniaxial crystal 582. The half-wave plate 181 corresponds to the half-wave plate 181 illustrated in FIG. 1.

By using a walk off angle produced by the refractive index that is different every polarized wave, the uniaxial crystal 582 performs polarization combination on one of the output light, whose polarized wave is rotated by the half-wave plate 181, and the other one of the output light, thereby the uniaxial crystal 582 generates polarization multiplexed light.

The polarization beam combiner 59 performs polarization combination on the third output light and the fourth output light that are output from the optical path changing prism 17. Specifically, the polarization beam combiner 59 includes the half-wave plate 191 and a uniaxial crystal 592. The half-wave plate 191 corresponds to the half-wave plate 191 illustrated in FIG. 1.

By using a walk off angle produced by the refractive index that is different every polarized wave, the uniaxial crystal 592 performs polarization combination on one of the output light, whose polarized wave is rotated by the half-wave plate 191, and the other one of the output light, thereby the uniaxial crystal 592 generates polarization multiplexed light.

As described above, with the optical transmission device 510 according to the fifth embodiment, the polarization beam combiner 58 includes the half-wave plate 181 and the uniaxial crystal 582. Furthermore, the polarization beam combiner 59 includes the half-wave plate 191 and the uniaxial crystal 592. Consequently, according to the fifth embodiment, the size of the polarization beam combiner 58 and the polarization beam combiner 59 can be reduced and, as a result, it is possible to further reduce the size of the optical transmission device 510.

Sixth Embodiment

In the following, an optical transmission device 610 according to a sixth embodiment will be described with reference to FIG. 6. FIG. 6 is a schematic diagram illustrating a configuration example of an optical transmission device according to a sixth embodiment. The optical transmission device 610 according to the sixth embodiment differs from the first embodiment in that the arrangement of the light sources 11-1 and 11-2 and the configuration of the other components is the same as that in the first embodiment. Accordingly, in a description below, components having the same configuration as those in the first embodiment are assigned the same reference numerals; therefore, descriptions thereof will be omitted.

As illustrated in FIG. 6, with the optical transmission device 610 according to the sixth embodiment, the casing 20 further accommodates the light sources 11-1 and 11-2. Furthermore, instead of the connecting block 12, the optical transmission device 610 includes lenses 61 and 62. The lens 61 inputs the light of the wavelength λ1 emitted from the light source 11-1 to the first optical modulator 131 on the modulator substrate 13. The lens 62 inputs the light of the wavelength λ2 emitted from the light source 11-2 to the second optical modulator 132 on the modulator substrate 13.

As described above, with the optical transmission device 610 according to the sixth embodiment, the casing 20 further accommodates the light sources 11-1 and 11-2. Consequently, according to the sixth embodiment, the size of the optical transmission device 610 in which the first optical modulator 131 and the second optical modulator 132 are integrally arranged on the single modulator substrate 13 can be reduced by an area corresponding to the light sources 11-1 and 11-2 in the width direction of the modulator substrate 13.

According to an aspect of an embodiment of the optical transmission device disclosed in the present invention, an advantage is provided in that damage of optical components can be prevented while reducing the size of a device in which a plurality of optical modulators are integrally arranged on a single substrate.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device comprising:
   a substrate on which a first optical modulator that modulates first light split off from light of a first wavelength, a second optical modulator that modulates second light split off from the light of the first wavelength, a third optical modulator that modulates third light split off from light of a second wavelength, and a fourth optical modulator that modulates fourth light split off from the light of the second wavelength are arranged in parallel along a width direction;
   a first prism that moves, to a side opposite to the third optical modulator and the fourth optical modulator along the width direction of the substrate, an optical path of first output light obtained by the first light being modulated by the first optical modulator and an optical path of second output light obtained by the second light being modulated by the second optical modulator; and
   a second prism that is arranged at a position away from the first prism along a longitudinal direction of the substrate and that moves, to a side opposite to the first modulator and the second optical modulator along the width direction of the substrate, an optical path of third output light obtained by the third light being modulated by the third optical modulator and an optical path of fourth output light obtained by the fourth light being modulated by the fourth optical modulator.

2. The optical transmission device according to claim 1, wherein the second prism is arranged at the position away from the first prism along the longitudinal direction of the substrate so that the second prism is overlapped with a part of the first prism when viewed from the longitudinal direction of the substrate.

3. The optical transmission device according to claim 1, wherein a length of the first prism in the width direction of the substrate is different from a length of the second prism in the width direction of the substrate.

4. The optical transmission device according to claim 1, further comprising:
   a first and a second collimator lenses that are arranged between the substrate and the first prism and that collimate the first output light and the second output light, respectively;
   a third and a fourth collimator lenses that are arranged between the substrate and the second prism and that collimate the third output light and the fourth output light, respectively; and
   a collimator lens holding member that holds the first and the second collimator lenses and the third and the fourth collimator lenses along the width direction of the substrate in an array.

5. The optical transmission device according to claim 1, further comprising:
   a polarization beam combining unit that performs polarization combination on the first and the second output light or the third and the fourth output light emitted from the first prism or the second prism;
   a casing that accommodates therein the substrate, the first prism, the second prism, and the polarized wave combining unit;
   a focusing lens that collects light obtained by the first and the second output light or the third and the fourth output light being subjected to polarization combination; and
   a holding member that is secured outside the casing and that holds the focusing lens.

6. The optical transmission device according to claim 5, wherein the holding member is secured outside the casing by laser welding.

7. The optical transmission device according to claim 5, wherein the polarization beam combining unit includes a half-wave plate and a polarization beam combiner (PBC) prism.

8. The optical transmission device according to claim 5, wherein the polarization beam combining unit includes a half-wave plate and a uniaxial crystal.

9. The optical transmission device according to claim 1, further comprising:

a casing that accommodates therein the substrate, the first prism and the second prism;

a polarization beam combining unit that performs polarization combination on the first and the second output light or the third and the fourth output light output from the first prism or the second prism;

a focusing lens that collects light obtained by the first and the second output light or the third and the fourth output light by being subjected to polarization combination; and a holding member that is secured outside the casing and that integrally holds the polarization beam combining unit and the focusing lens.

10. The optical transmission device according to claim 9, wherein the holding member is secured outside the casing by laser welding.

11. The optical transmission device according to claim 9, wherein the polarization beam combining unit includes a half-wave plate and a polarization beam combiner (PBC) prism.

12. The optical transmission device according to claim 9, wherein the polarization beam combining unit includes a half-wave plate and a uniaxial crystal.

13. The optical transmission device according to claim 1, further comprising:

a first light source that emits light of the first wavelength;

a second light source that emits light of the second wavelength; and a casing that accommodates the first light source and the second light source.

\* \* \* \* \*